United States Patent [19]

Shojima et al.

[11] Patent Number: 4,653,107

[45] Date of Patent: Mar. 24, 1987

[54] ON-LINE RECOGNITION METHOD AND APPARATUS FOR A HANDWRITTEN PATTERN

[75] Inventors: Hiroshi Shojima, Hitachi; Soshiro Kuzunuki, Katsuta; Kotaro Hirasawa, Hitachi, all of Japan

[73] Assignee: Hitachi, Ltd., Tokyo, Japan

[21] Appl. No.: 686,001

[22] Filed: Dec. 24, 1984

[30] Foreign Application Priority Data

Dec. 26, 1983 [JP] Japan .................................. 58-249704

[51] Int. Cl.$^4$ ............................................... G06K 9/62
[52] U.S. Cl. ........................................... 382/13; 382/3; 382/22
[58] Field of Search ................................ 382/3, 13, 22

[56] References Cited

U.S. PATENT DOCUMENTS

| | | | |
|---|---|---|---|
| 4,317,109 | 2/1982 | Odaka et al. | 382/13 |
| 4,365,235 | 12/1982 | Greanias | 382/13 |
| 4,542,412 | 9/1985 | Fuse et al. | 382/13 |
| 4,553,258 | 11/1985 | Chainer | 382/13 |
| 4,573,196 | 2/1986 | Crane et al. | 382/13 |

*Primary Examiner*—Howard A. Birmiel
*Attorney, Agent, or Firm*—Antonelli, Terry & Wands

[57] ABSTRACT

Coordinates of a handwritten pattern drawn on a tablet are sequentially sampled by a pattern recognition unit to prepare pattern coordinate data. Based on an area encircled by segments created by the sampled pattern coordinate data of one stroke and a line connecting a start point and an end point of the one-stroke coordinate data, the sampled pattern coordinate data of the one stroke is converted to a straight line and/or curved line segments. The converted segments are quantized and normalized. The segments of the normalized input pattern are rearranged so that the input pattern is drawn in a predetermined sequence. Differences between direction angles for the rearranged segments are calculated. Those differences are compared with differences of the direction angles of the dictionary patterns read from a memory to calculate a difference therebetween. The matching of the input pattern and the dictionary pattern is determined in accordance with the difference. If the matching fails, the first or last inputted segment of the input pattern is deleted or the sampled pattern coordinate data of the next stroke is added, to continue the recognition process.

27 Claims, 24 Drawing Figures

× $P_1$ : INPUT POINT
○ $S_1$ : SMOOTHING POINT
m,n : DIVIDING POINT

FIG. 6
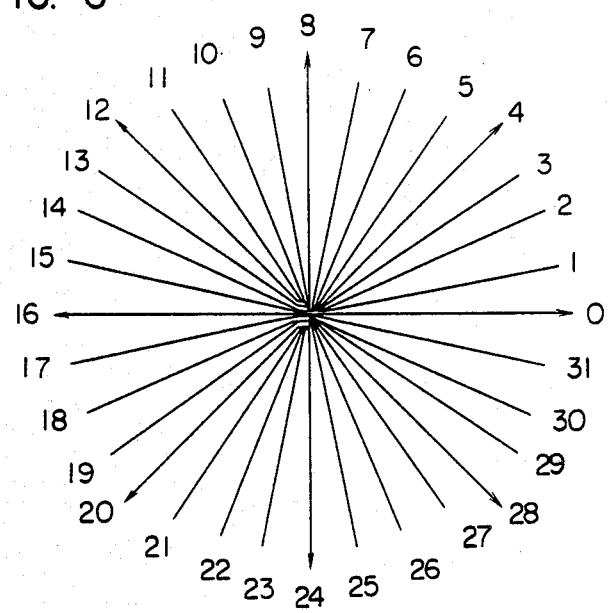
FIG. 7a
SAMPLE POINT COORDINATE DATA S1
| NO. | COORDINATE |
|---|---|
| 1 | SP₁ |
| ⋮ | ⋮ |
| n-1 | SPn-1 |
| n | SPn |
FIG. 7b
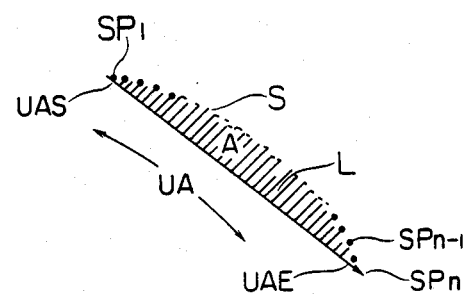
FIG. 7c
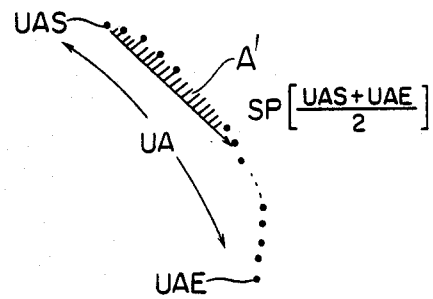

FIG. 7d
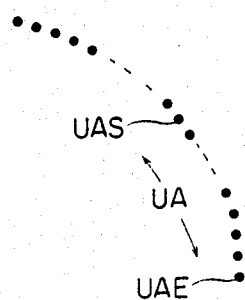
FIG. 7e
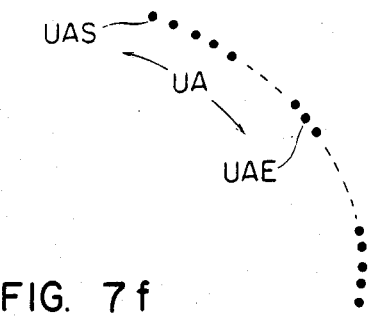
FIG. 7f
| NO. | START POINT | END POINT | STATUS 1 | STATUS 2 | ANGLE |
|---|---|---|---|---|---|
| 1 | ┊ | ┊ | ┊ | ┊ | ┊ |
| 2 | | | | | |
| $i$ | $SP_f$ | $SP_k$ | $ST_f$ | $ST_k$ | $\theta_{fK}$ |
| ┊ | ┊ | ┊ | ┊ | ┊ | ┊ |
FIG. 8a
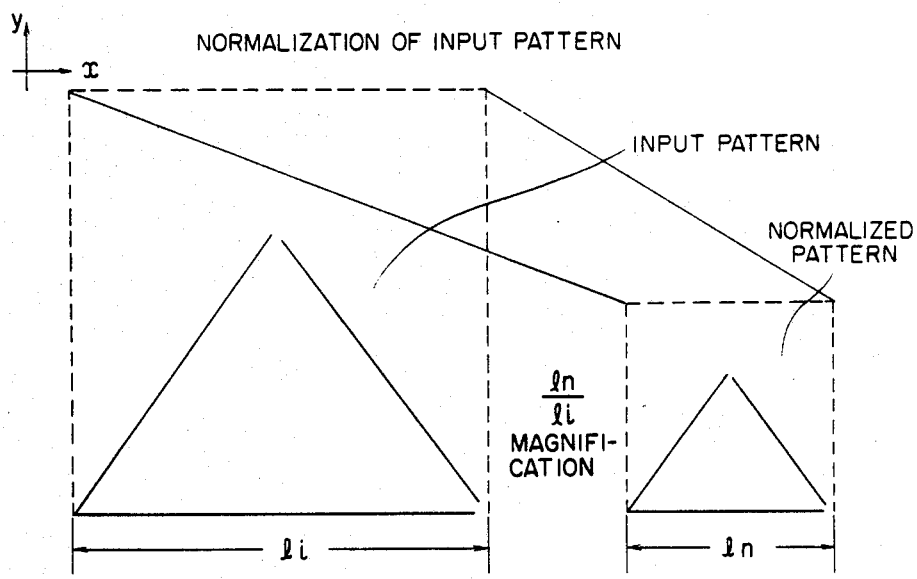

(a) NORMALIZED PATTERN (b) DECISION — CONNECTION CONDITION : DISTANCE BETWEEN END POINTS $< l_n \times 0.10$ (c) CONNECTION LIST $L_3$

| SEGMENT NO. | START POINT | END POINT |
|---|---|---|
| 1 | 3 START POINT | 2 START POINT |
| 2 | 1 END POINT | 3 END POINT |
| 3 | 1 START POINT | 2 END POINT |

[INPUT PATTERN]

[ NUMERALS INDICATE SEGMENT NUMBERS IN INPUTTING ORDER ]

[ONE-DIMENSIDE DP METHOD]

FIG. 14a  INDEPENDENT FROM NUMBER OF STROKES
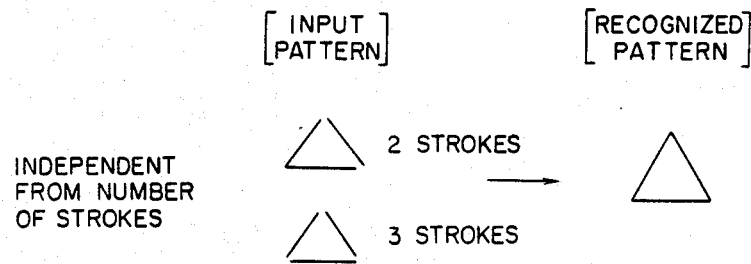
FIG. 14b  INDEPENDENT FROM ORDER OF STROKES
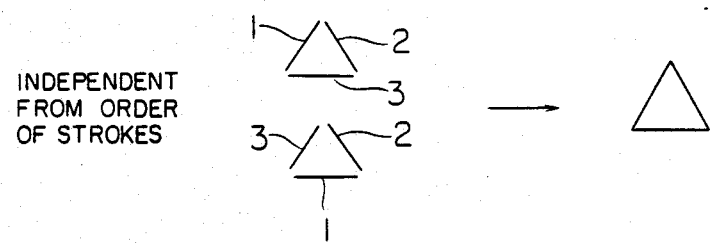
FIG. 14c  INDEPENDENT FROM ROTATION
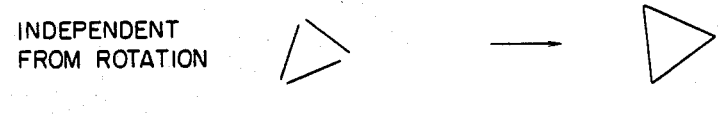
FIG. 14d  INDEPENDENT FROM BOUNDARY
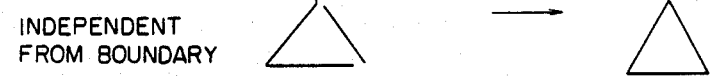

ON-LINE RECOGNITION METHOD AND APPARATUS FOR A HANDWRITTEN PATTERN

The present invention relates to an on-line recognition method and apparatus for a handwritten pattern, and more particularly to a graphic data input method and apparatus suitable for an on-line handwritten document preparation system.

As large scale computer systems have come into wider use and the performance of information processing terminal equipment has been improved, users of such computers have seen the need for a handwritten pattern input device for use as one of the input means to the computer.

Input information is classified into characters and graphics. Prior art examples are described below.

PRIOR ART EXAMPLE 1

General description of on-line recognition of a handwritten character is found in Nikkei Electronics, 1973, No. 5-7, pages 46~59. A method for recognizing a handwritten character by representing the handwritten character by a series of short lines and comparing it with a characteristic in a dictionary is explained below.

FIG. 1 shows a smoothing process of a handwritten pattern. $P_0$-$P_1$-$P_2$-$P_3$ represents an input pattern. The point $P_0$ at which a pen was first dropped is defined as a first sampling point $S_0$ and a circle centered at $S_0$ and having a predetermined radius (e.g., 5) is drawn to seek a next point $P_1$ which is outside of the circle. A distance between the points $P_0$ and $P_1$ is divided to have a ratio of n/m (e.g., 3/1) and the dividing point is defined as a new sampling point $S_1$. A circle centered at $S_1$ and having the radius 5 is drawn to seek a next point $P_2$ which is outside of the circle. A distance between the points $P_1$ and $P_2$ is divided to have a ratio of 3/1 and a dividing point is defined as a new sampling point $S_2$.

The above process is continued until the pen is raised to define the sampling points $S_0$, $S_1$, $S_2$ and $S_3$. If an angle made by the line segment $S_0S_1$ and the line segment $S_1S_2$ is smaller than a predetermined angle, the line $S_0S_2$ is handled as one straight line segment $S_0S_2$. The above process is repeated so that the handwritten pattern is approximated by segments.

The segment data which approximates the handwritten pattern is recognized as a specific character by a character recognition tree.

This method is called a direction code method. The points $S_0 \sim S_3$ sampled in the smoothing process are serially connected to divide the handwritten pattern into a plurality of segments. If the handwritten pattern consists of short segments (for example, KANJI character), the input pattern has little vibration and the pattern can be effectively converted to a straight segment, but if the pattern includes a relatively long stroke, it is not converted to a straight segment because of vibration included in the stroke. It is not sufficient to absorb the vibration which is included when a long stroke pattern is handwritten. In order to absorb the vibration, it is necessary to repeat the segmentation step several times for the segmented data.

Since this example uses the number of strokes as one factor of classifying the characters, a new recognition method is necessary for a continuously written character.

PRIOR ART EXAMPLE 2

A candidate lattice method is explained. (See for example "On-line Recognition Algorithm for Hand-Sketched Flowchart by Candidate Lattice Method", Papers of Institute of Electronics and Communications of Japan, '83/6, Vol. J66-D, No. 6, p675-p681, or "On-Line Recognition Algorithms for Handwritten Chinese Characters and Hand-sketched Line Figures", Institute of Television of Japan, Vol. 6, No. 44 (1983), p43-p48, Mushashino Communication Laboratory.)

FIG. 2 shows a flow chart of the candidate lattice method.

Candidate Pattern Extraction (Step 1)

Start and end point coordinates P of an input stroke are collated to characteristic points of a symbol G (to which all of the patterns in a dictionary 10 are applicable) and a plurality of sets of one-stroke sequences (candidate stroke sequences) each of which passes through all characteristic points $P_i$ ($i=1 \sim n$, n is the number of characteristic points of the symbol G) are generated. If the input stroke sequence and the generated candidate stroke do not differ (step 5), the symbol G is selected as a candidate pattern $G_c$. In this manner, the dictionary patterns can be classified while modifications and distortions of the handwritten patterns are being absorbed.

Calculation of Difference (Step 2)

The candidate lattice method uses a dynamic programming matching (DP matching) method which evaluates not only the Euclid distance between the characteristic point and the stroke but also a direction of a tangent line of the stroke corresponding to the characteristic point. The difference is represented by $$d^2 = \min_u \left[ \sum_{m=1}^{M} \{(x_m - x'_{u(m)})^2 + (y_m - y'_{u(m)})^2 + \alpha \cdot h(m, u(m))\} \right] \quad (1)$$

where $(x_m, y_m)$ is input stroke coordinate, $(x'_{u(m)}, y'_{u(m)})$ is candidate stroke coordinate, $$u(m) = \begin{cases} u(1) = 1: \text{ start point} \\ u(M) = M: \text{ end point} \\ \text{if } u(i) = j, \ u(i+1) = \begin{cases} j \\ j+1 \\ j+2 \end{cases} \end{cases}$$

$\alpha$: constant $$h(i, j) = \left| \tan^{-1}\left(\frac{y_{i+1} - y_i}{x_{i+1} - x_i}\right) - \tan^{-1}\left(\frac{y'_{i+1} - y'_i}{x'_{i+1} - x'_i}\right) \right|$$

The first and second terms in { } in the right side of the equation (1) represent the Euclid distance between the input stroke end point and the characteristic point of the dictionary pattern, and the third term represents a difference between directions of tangent lines of the input stroke and the candidate stroke at the characteristic point $(x'_m, y'_m)$.

Searching of Candidate Lattice (Step 3)

The difference in the step (2) is calculated for each pattern extracted in the step (1) and it is compiled to form a table.

A pattern having the smallest sum of the differences is selected from the patterns derived from the table. A candidate pattern which cannot exist judging from a connection rule 11 of an input stroke to another input stroke is eliminated, even if it has a small difference from the input stroke.

Through the steps (1) to (6), the handwritten pattern can be recognized without relying on the number of strokes, the order of strokes and the segmentation. However, no recognition means is provided for (1) continuous writing of two patterns, and (2) rotation of pattern. Thus, those patterns are difficult to recognize.

In the light of the above, it is an object of the present invention to provide an on-line recognition method and apparatus for a handwritten pattern which automatically separates patterns, which does not depend on the order of strokes, the number of strokes and the inclination of the pattern and which operates at a high speed.

Elements of a pattern are segments and a plurality of segments form one pattern.

On the other hand, a handwritten pattern inputted from a tablet is read into a computer as a time-serial sample point sequence.

In the present invention, a characteristic data derived from the sample point sequence and a line connecting two of the sample points is used to decompose the sample point sequence to segments while effectively absorbing vibration included in the handwritten pattern. The plurality of segments are used as a basic unit of data, which is processed in a manner described in an embodiment so that a boundary between the patterns is automatically recognized without depending on the number of strokes, the order of strokes and the rotation of the input pattern.

The above and other objects, features and advantages of the present invention will be apparent from the following detailed description taken in conjunction with the accompanying drawings, in which:

FIG. 6 shows a direction code;

FIGS. 7a, 7b, 7c, 7d, 7e and 7f illustrate segmentation of a handwritten pattern by the present invention (area method);

FIGS. 8a and 8b illustrate normalization of a pattern;

FIGS. 14a, 14b, 14c and 14d show examples of recognized patterns.

Figure 1:
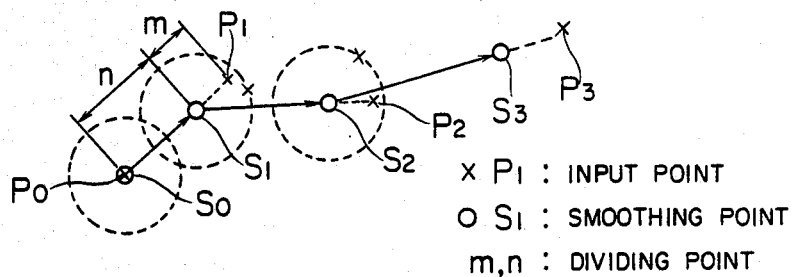
FIG. 1 shows a prior art method of smoothing.
Figure 2:
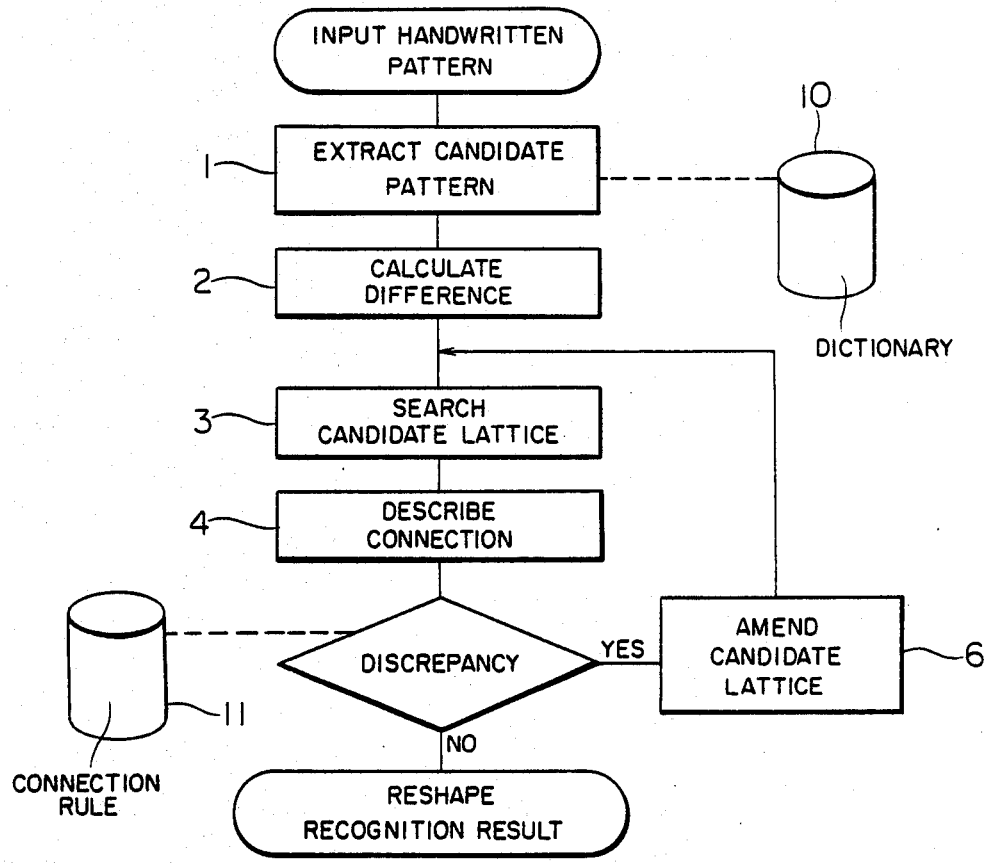
FIG. 2 shows a flow-chart of a prior art handwritten pattern recognition of a candidate lattice method.
Figure 3:
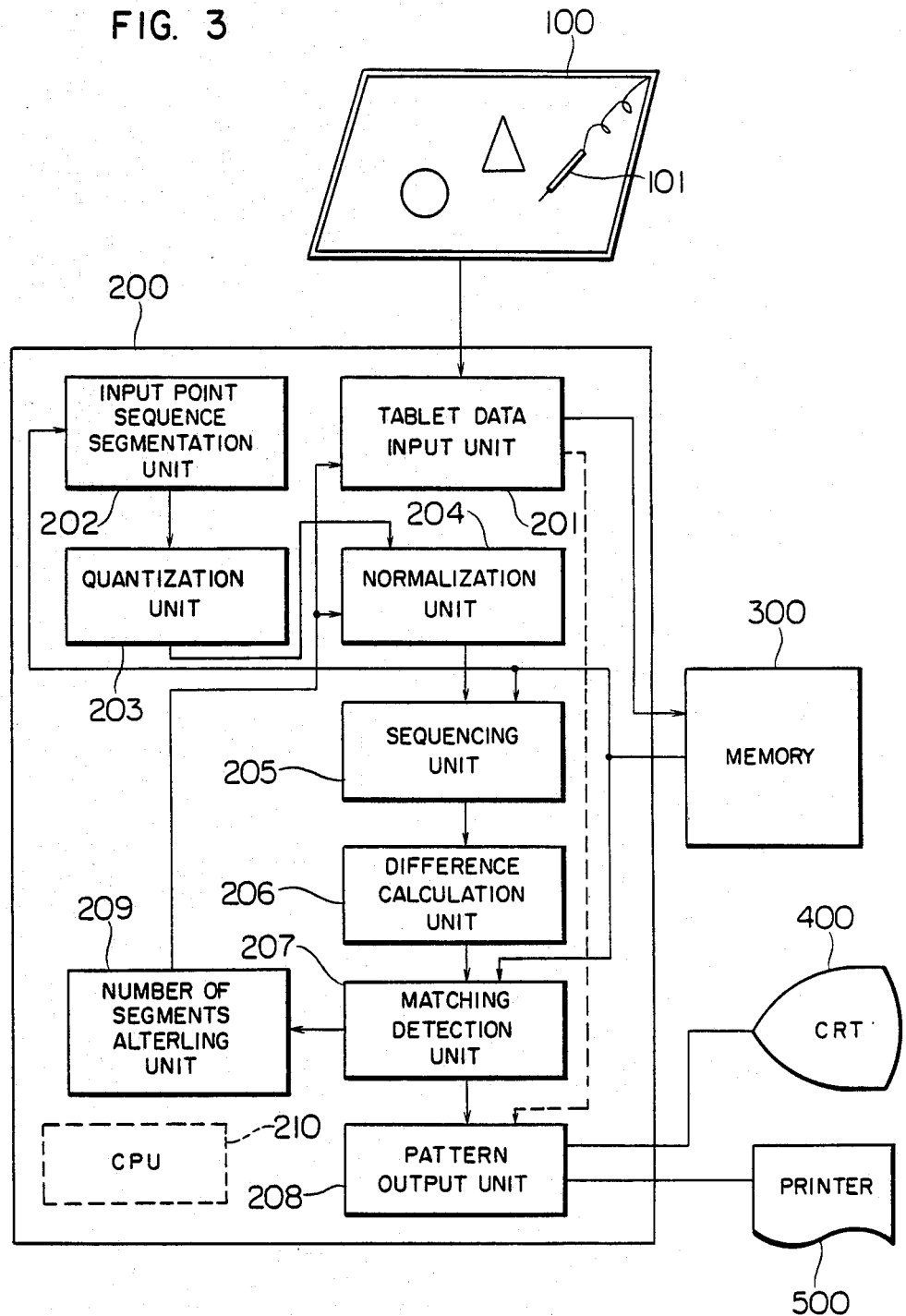
FIG. 3 shows one embodiment of an on-line handwritten pattern recognition apparatus of the present invention.

FIG. 3 shows an on-line handwritten character recognition apparatus of the present invention. A user draws a pattern on a tablet 100 by using a pen 101. The tablet 100 periodically samples coordinates of the handwritten pattern and sends a coordinate signal to a pattern recognition apparatus 200.

The pattern recognition apparatus 200 comprises a tablet data input unit 201 which sequentially reads in the coordinate signal for each stroke (from pen-down to pen-up), a segmentation unit 202 for converting the tablet data to straight line and curved line segments, a quantization unit 203 for quantizing an angle of a line connecting start and end points of each segment by direction codes (for example, 32 direction codes), a normalization unit 204 for normalizing segmentation data from the segmentation unit 202 to a square having a side dimension of 100, a sequencing unit for sequencing the quantization data into a one-dimension input data sequence in accordance with the normalization data and sequencing standard pattern information read from a memory 300 into a one-dimension standard data sequence, a difference calculation unit 206 for comparing the one-dimension input data sequence with the one-dimension standard data sequence to calculate a difference therebetween, a matching detection unit 207 for detecting matching of the input data and the standard data read out from the memory 300 by comparing the calculated difference with a predetermined value, a pattern output unit 208 for developing the standard pattern data, when the matching is detected by the matching detection unit 207, on a bit map memory (not shown) as a recognized pattern and displaying it on a CRT 400 by a video signal, and a number of segments altering unit 209 for decreasing the number of segments of the current stroke or adding the tablet input data of the next stroke to be compared with the standard pattern when non-matching is detected by the matching detection unit 207 to repeat the recognition process. Those steps are carried out by a CPU 210. The pattern output unit 208 outputs the content of the bit map memory to a printer 500 to make a hard copy of the recognized pattern. When the handwritten pattern inputted by the tablet data input unit 201 is to be displayed on the CRT 400, the tablet data may sent to be pattern output unit 208 as shown by a broken line in FIG. 3.

Figure 4:
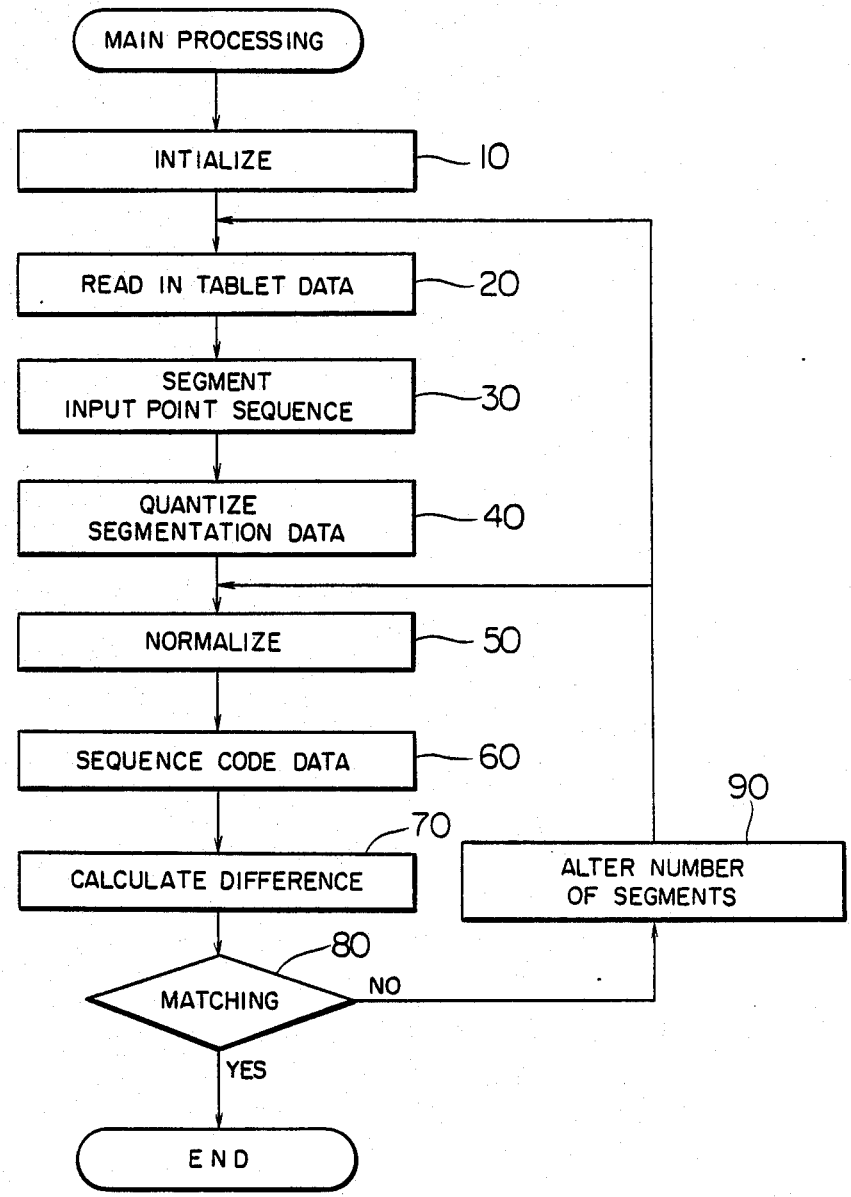
FIG. 4 is a flow chart of one embodiment of an on-line handwritten pattern recognition method of the present invention.

A flow chart of a program executed by the CPU 210 in the pattern recognition apparatus 200 of FIG. 3 is shown in FIG. 4. Steps in FIG. 4 will be described in detail and only a brief explanation thereof is given here.

In a step 10, work areas necessary for the following steps are initialized and user designation values are set. In a step 20, the coordinate point sequence P from the tablet 100 is sampled by using the distance between the coordinate points as a threshold and storing the coordinate data in the memory 300. The step 20 continues until the pen 101 on the tablet 100 is raised. An origin of the coordinate is located at the left-bottom of the CRT 400 having 1700 dots in a horizontal line and 2300 dots in a vertical line, and the coordinate value corresponds to the dots of the screen of the CRT 400.

In a step 30, a line connecting start and end points of the sequence of coordinate data for one stroke (from pen-down to pen-up) stored in the memory 300 is defined and an area A encircled by that line and the segments connecting the respective points of the data sequence is determined in order to convert the data sequence to segment data. If the area A is smaller than a predetermined threshold $A_{TH}$ (e.g. 100), the segment sequence is replaced by the line connecting the start and end points of the data sequence. If $A>A_{th}$, the data sequence is converted to a plurality of segmentation data by a mid-point method which will be described in detail. If an absolute value of change or difference of angle made by two contiguous segments of the segmentation data is smaller than a predetermined angle (e.g. 12 degrees) and the sign thereof is equal to that of the change or difference of angle made by the immediately preceding two segments and the length ratio is within a predetermined range (e.g. 0.5~2.0), those two segments are handled as a portion of a curve. The above process is carried out for all segment data so that the data sequence is converted to line and/or curve segmentation data. Since this process uses the area method in the segmentation, small vibrations in the input data sequence can be effectively absorbed by properly selecting the threshold $A_{th}$.

In a step 40, the angle of each straight line segment and the angle of the line connecting the start and end points of each curved line segment are quantized by direction codes, for example, 32 direction codes. For the curved segment, in order to distinguish it from the straight line segment, "32" is added if the segment rotation is clockwise (expanding leftward) and "64" is added if the segment rotation is counterclockwise (expanding rightward), to the direction code of the line.

In a step 50, the segment data for one stroke is normalized to a square having a side dimension of 100, for example, in order to examine the connection relation of the segments in the segmentation data produced in the step 30. If the distance between the end points of two segments in the segmentation data is shorter than a predetermined length (e.g. 5), they are determined to be in a connection relation, and information on the start and end points, destination segment number and information on the start and end points of the destination segment are registered in a connection list.

In a step 60, in order to prepare a segment direction code sequence arranged in a predetermined forward direction based on the segment quantization data produced in the step 40 and the connection list produced in the step 50, the segmentation data is sorted in an ascending order of X coordinates of the end points of the segments, the direction codes are sequentially connected starting from the first segment in the sorted list based on the connection list to prepare the sequenced data, which is then registered.

In a step 70, a difference between the sequenced data produced in the step 60 and a standard pattern $G_{ST}$ stored in the memory 300 is determined.

In a step 80, in order to evaluate the matching, the difference F determined in the step 70 is compared with a predetermined threshold $F_0$ (e.g. 10), and if $F \leq F_0$, the candidate pattern $G_{ST}$ which resulted in the difference F is outputted as a recognized pattern $G_r$. On the other hand, if $F>F_0$, the recognition fails and the process proceeds to a step 90.

In the step 90, for the dynamic programming (DP) processing of the segmentation data, the segment data having a small segment number or the last segment number is deleted to prepare new segmentation data. Then, the process proceeds to the step 50. The above steps are repeated and when the segmentation data to be deleted is no longer present, all segmentation data is recovered and the process proceeds to step 20 where a new segmentation data is added.

Through the steps 10 to 90, the order of strokes, the number of strokes and the division of the input pattern are rendered independent and a man-machine operability is significantly improved as compared with the prior art pattern input method.

Since the processing of the on-line recognition apparatus 200 of FIG. 3 is carried out in real time, the present apparatus functions as an on-line handwritten pattern recognition apparatus.

In order to eliminate the restriction for the number of strokes, the order of strokes, the rotation and the boundary of the pattern inputted by the tablet 100, the present invention is constructed on the condition that the elements of the pattern are segments and the shape of the pattern is determined by the order of connection of the segments and the angle differences.

The number of strokes is that required to draw the pattern by strokes with each stroke being defined by pen-down to pen-up, the order of strokes is that in drawing the pattern, the rotation is an angle of the input pattern relative to the standard pattern, and the boundary is an indication of an area corresponding to the pattern in the input strokes to be compared with the dictionary pattern.

Figure 5:
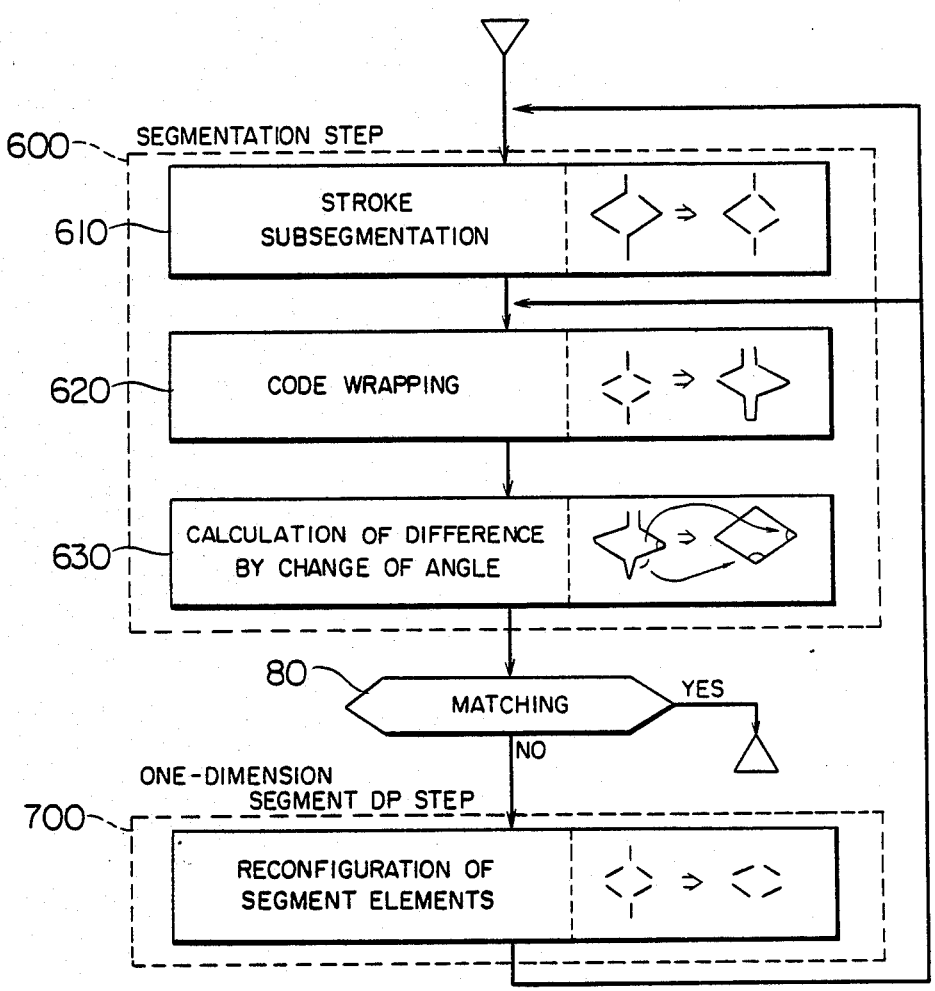
FIG. 5 is a flow chart of a recognition method of the present invention.

Two characteristic portions of the present invention are extracted from the flow chart of FIG. 4 and they are shown in FIG. 5. They are a segmentation step 600 for determining the matching to the dictionary pattern and a one-dimension segment dynamic programming (DP) step 700 for extracting the pattern from the input strokes.

The segmentation step 600 comprises a subsegmentation step 610 for segmenting the stroke into basic units for processing, a code wrapping step 620 for tracking the pattern to wrap it for generating a code list and a difference calculation step 630 by a change or difference of angle independent of the rotation of the input pattern.

In the present invention, the step 600 relieves the restriction of the number of strokes and the rotation and the one-dimension segment DP step 700 reconfigures the elements to relieve the restriction of the boundary.

(1) Outline of Processing

The input handwritten pattern is processed in accordance with the flow of steps shown in FIG. 5. Major steps of the present invention are described below.

(1) Subsegmentation of stroke (Step 610)

The handwritten pattern inputted from the tablet 100 is read as a set of sample points for each stroke. It must be converted to more than one segment.

The direction of the segment from the start point to the end point is quantized by the direction codes shown in FIG. 6.

(2) Code wrapping (Step 620)

Based on connection information on the end points of the segmentation data extracted in (1), a code list $L_4$ (FIG. 10) with the direction codes is prepared. The segmentation data is traced to wrap the input pattern.

(3) Calculation of difference by change of angle

The dictionary patterns (classified by the number of segments) subsegmented in (1) are read from the memory 300 and a code list ($L_5$) of the dictionary patterns is prepared by the processing (2), and a difference between two adjacent direction codes in the code list $L_4$ is compared with that in the code list $L_5$. $f_i$ represents a unit difference.

$$f_i = |\{L_4(i) - L_4(i-1)\} - \{L_5(i) - L_5(i-1)\}| \qquad (2)$$

where $i = 2, 3, \text{---} n$ and n is the number of segments of $L_5$. An average value of $f_i$ is defined as a difference F of the handwritten pattern. Ideally, if $F = 0$, it is regarded that the input pattern matches the dictionary pattern.

However, the value F is usually between 0 and 10 and a minimum value of F obtained from the differences between the input pattern and the dictionary patterns is used as a recognized pattern.

(4) Reconfiguration of elements (Step 700)

When the input pattern contains a continuation of the pattern and the connection line, the matching between the input pattern and the dictionary pattern is not attained because the patterns are registered in the dictionary pattern by pattern. Accordingly, after the handwritten pattern has been segmented, a combination of the elements corresponding to the pattern to be compared with the dictionary pattern should be extracted. The determination of the order of the particular segments to be deleted in the extraction process directly affects to the number of times of looping of the recognition process and hence to the process time. Accordingly, an efficient extraction is required.

The extraction process has usually employed an all-combination method which uses all combinations of the segments. However, since it needs a large number of times of operation to extract the pattern, the onedimension dynamic programming (DP) method which makes use of a characteristic of the handwritten pattern is used in the present invention. As a result, the number of times of operations to extract the pattern is reduced by a factor of several to ten or more as compared with the all-combination method. The extracted elements are processed in accordance with the recognition process described above.

(2) Description of Process

The basic pattern recognition algorithm described in (1) is now explained in detail.

Subsegmentation of stroke (FIGS. 7a~7f)

The sample point coordinate data $S_1$ of the handwritten pattern inputted from the tablet 100 is read in for each stroke (from pen-down to pen-up).

As shown in FIG. 7a, a start point $SP_1$ to an end point $SP_n$ of the sample point coordinate data $S_1$ derived from the handwritten pattern is defined as an unidentified area (UA), the start point $SP_1$ is defined as an unidentified area start point (UAS) and the end point $SP_n$ is defined as an unidentified area end point (UAE).

Then, as shown in FIG. 7b, an area A defined by the handwritten line S and a line L connecting the start point and the end point of the line S is determined. The area A may be readily determined by a pedestal method in geography.

If the calculated area A is smaller than a predetermined threshold $A_{th}$, the handwritten line S is regarded as a straight line and a segment registration is carried out.

If the area A is larger than the threshold $A_{th}$, the end point is moved to a mid-point between the UAS point and the UAE point as shown in FIG. 7c and the area A' is recalculated.

The area A' is again compared with the threshold $A_{th}$, and if $A' < A_{th}$, the current end point is selected as a new UAS point and a new line L is drawn. If $A' \geq A_{th}$, the current end point is selected as a new UAE point as shown in FIG. 7e and an area A" is calculated.

The above process is continued until the UA is exhausted, that is, the UAE point reaches the UAS point. Then, the start point to the end point is regarded as one line and the segment registration is carried out. This method is called a mid-point method.

In the segment registration step, the end point of the registered segment is set as a new start point and the UAS point, and the end point of the handwritten line S is set as a new end point and the UAE point.

Coordinates $SP_j$ and $SP_k$ of the start point and end point of the segment L, the pen up/down status $ST_j$ and $ST_k$ at each point and an angle $\theta_{j,k}$ of the line connecting the start point and the end point are registered in the segment list as shown in FIG. 7f. Those steps are continued until all handwritten strokes S are registered.

Code wrapping

In this process, it is necessary to check the connection relation of the start and end points of the elements of the segments. The normalization of the input pattern and the preparation of the connection list are explained.

Figure 8B:
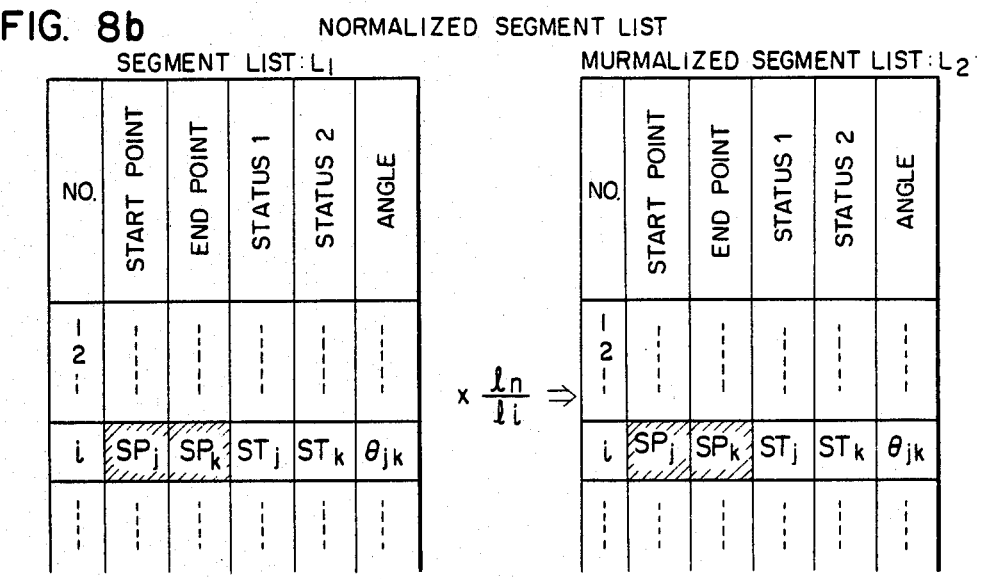

FIGS. 8a and 8b illustrate the normalization of the input pattern (e.g., triangle). As shown in FIG. 8a, a larger one ($l_i$) of an x-direction dimension and a y-direction dimension of the input pattern is enlarged or reduced to a normalization size ($l_n$) Thus, as shown in FIG. 8b, the start point and the end point in the segment list $L_1$ is magnified by a factor of $l_n/l_i$ to prepare a normalized segment list $L_2$.

Figure 9:
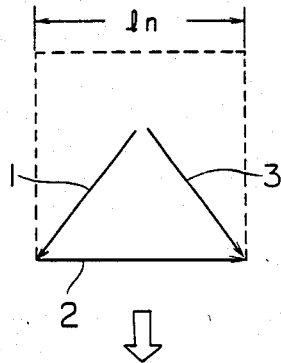
FIG. 9 shows a connection list.

The preparation of the connection information of the end points of the segment elements is now explained with reference to FIG. 9. FIG. 9(a) shows a normalized input pattern (triangle).

As shown in FIG. 9(b), 5~10% of the normalization size $l_n$ is set as a connection distance of the end points of the segment elements. If the distance between the end points of the segments is shorter than the connection distance, it is regarded that the two end points are in connection. This information is written into a connection list $L_3$ shown in FIG. 9(c). In the illustrated example, the segment element 1 has two connection information, "the start point is in connection with the start point of the segment element 3" and "the end point is in connection with the start point of the segment element 2".

Figure 10:
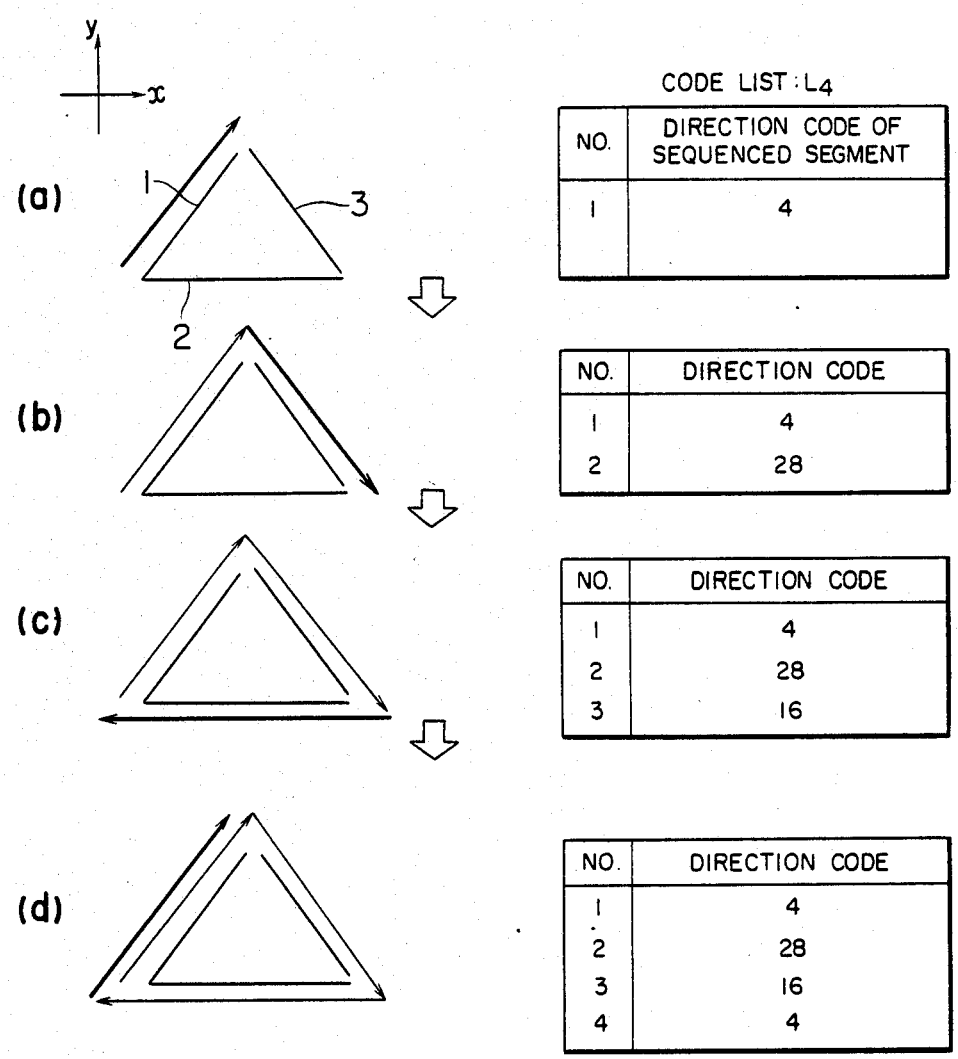
FIG. 10 illustrates code wrapping.

The code wrapping by the segment connection list $L_3$ and the normalized segment list $L_2$ is explained with reference to FIG. 10.

The start point of wrapping the segment elements may be on any segment element. In FIG. 10, the segment elements are traced clockwise starting from a leftmost end point.

(1) In FIG. 10(a), the segment element of the input pattern having the leftmost end point is determined.

(2) The end point determined in (1) is selected as a new start point, and a segment element (element 1) which is most closely oriented to the y-direction is selected from the segment element which includes the start point and the segment elements connected to the start point, and a direction code (4 in this case, see FIG. 6) as viewed from the start point is registered in the code list $L_4$.

(3) It is seen from the segment connection list $L_3$ (FIG. 9(c)) that the start point of the segment element 1 is in connection with the segment element 3. Therefore, a direction code (28) as viewed in a tracing direction is registered in the code list L₄.

(4) The code list L₄ is prepared in the same manner as (3). If there is an input segment element which has not been used for wrapping, the process starting from (1) is repeated. If there is no such segment element, the process is terminated. Through this process, a clockwise code list L₄ with respect to the input pattern is prepared as shown in FIG. 10(d).

A method for calculating a difference between the input pattern and the dictionary pattern is explained.

Figure 11:
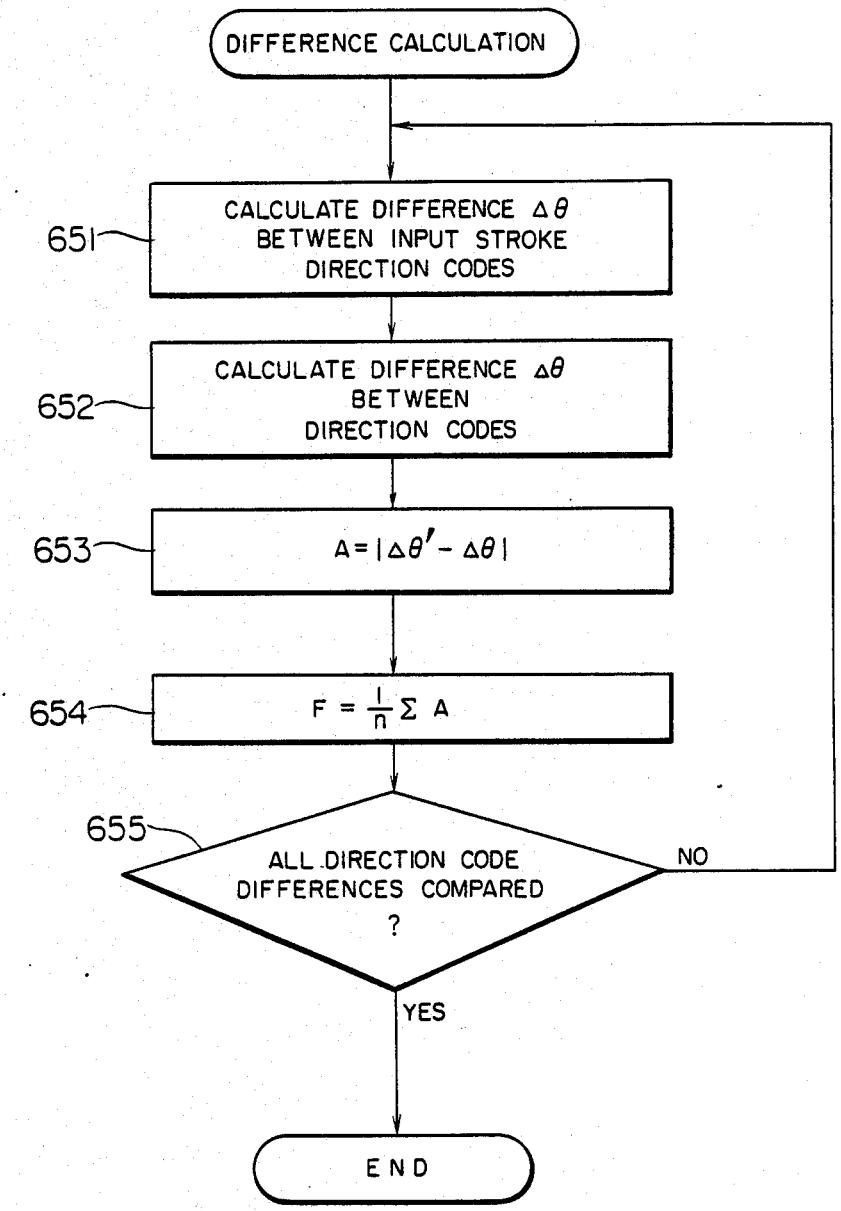
FIG. 11 shows a flow chart for calculation of analogy.

FIG. 11 shows a flow chart for the difference calculation by the change of angle. In a step 651, a difference $\Delta\theta'$ between the direction codes of two contiguous segments of the input pattern is calculated based on the code list L₄. In a step 652, a difference $\Delta\theta$ between the direction codes of the dictionary pattern read from the memory 300 is calculated. In a step 653, an absolute value of a difference between the difference between the direction codes of the input pattern and the difference between the direction codes of the dictionary pattern is calculated. In a step 654, an average of the absolute values for all code differences is calculated to determine a difference F. In a step 655, the difference F is compared with a predetermined value, and if the difference F is equal to or smaller than the predetermined value, it is determined that the input pattern matches the read dictionary pattern and the difference calculation step 630 is terminated. On the other hand, if the difference F is larger than the predetermined value, it is determined that the input pattern does not match the read dictionary pattern and the process returns to the step 651 where the direction code differences of the dictionary pattern are rearranged and the difference calculation is repeated.

Figure 12:
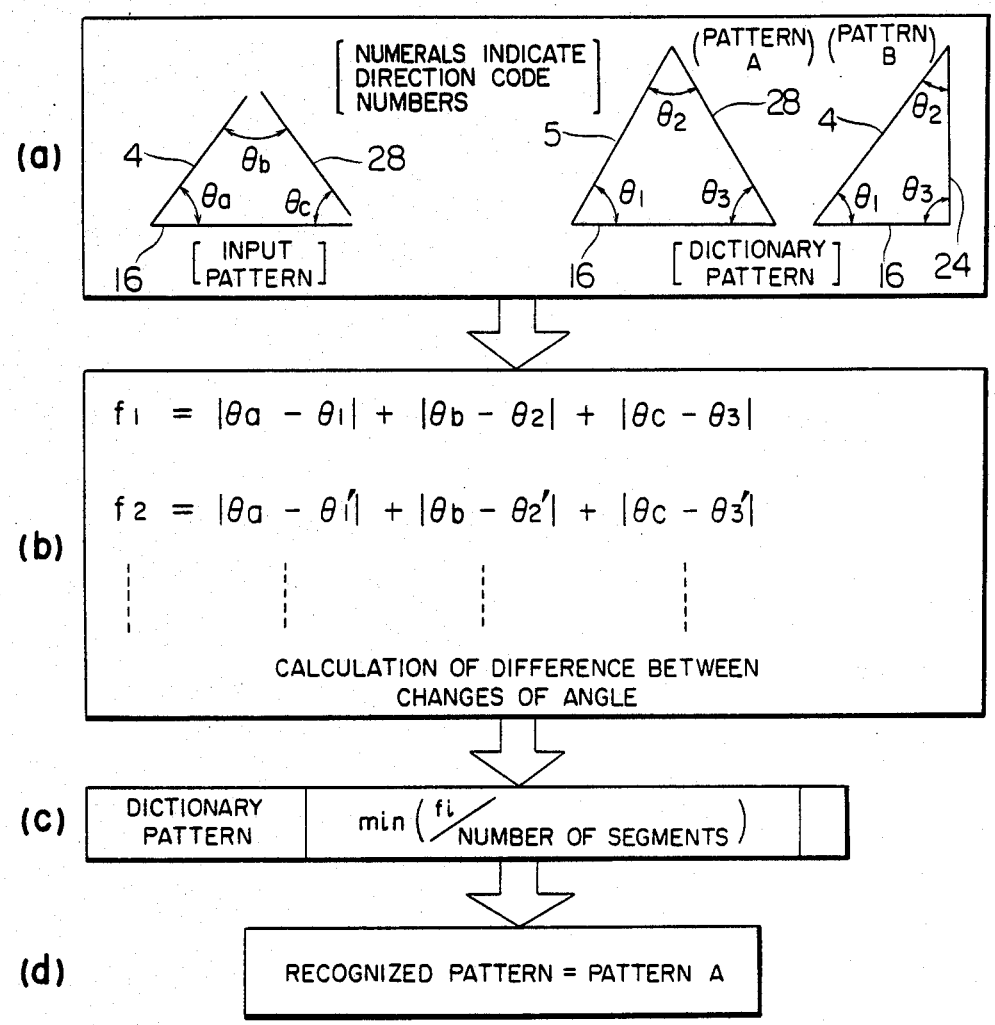
FIG. 12 illustrates calculation of difference.

Referring to FIG. 12, the difference calculation is specifically explained.

Difference calculation by change of angle

Based on the code list L₄ prepared in the code wrapping process, matching with the dictionary pattern is carried out.

First, the following three angle difference data are obtained from the code list L₄.

$$\theta_a = L_4(2) - L_4(1)$$

$$\theta_b = L_4(3) - L_4(2)$$

$$\theta_c = L_4(4) - L_4(3)$$

For the angle difference data $\theta_a \sim \theta_c$ of the input patterns shown in FIG. 12(a) and the angle difference data $\theta_1 \sim \theta_3$ or $\theta_1' \sim \theta_3'$ of the dictionary pattern, sums $f_1, f_2, \text{---}$ of absolute values of differences between corresponding data are calculated as shown in FIG. 12(b). As shown in FIG. 12(c), the dictionary pattern which presents the minimum $f_i$ for the input pattern is determined and it is outputted as a recognized pattern (FIG. 12(d)).

In FIG. 12, assuming that $\theta_a = 24, \theta_b = -12, \theta_c = -12,$ $\theta_1 = 23, \theta_2 = -12, \theta_3 = -11,$ $\theta_1' = 20, \theta_2' = -8, \theta_3' - 12$ then $f_1 = 2$ for pattern A and $f_2 = 8$ for pattern B. By averaging $f_1$ and $f_2$ by the number of segment elements, we get $f_1/3 = 0.67$ for pattern A and $f_2/3 = 2.67$ for pattern B.

Thus, the recognized pattern is the pattern A.

Reconfiguration of segment elements

The description on the subsegmentation of the stroke to the calculation of the difference (segmentation step 600 in FIG. 5) is based on the presumption that the pattern portion is independently extracted from a plurality of handwritten patterns.

Figures 13A, 13B:
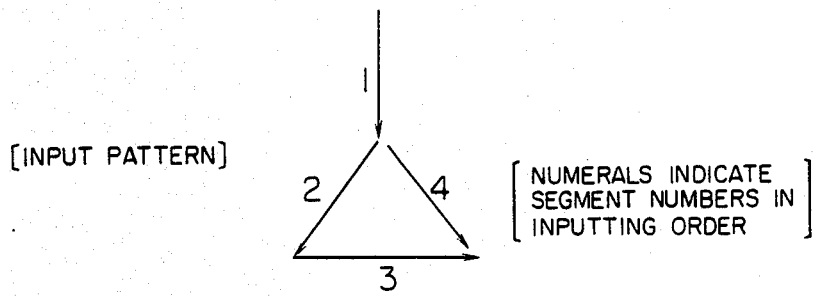
FIGS. 13a and 13b illustrate reconfiguration of elements.

However, it frequently occurs, when a handwritten flow chart is inputted as shown in FIG. 13(a), that a connecting line and a pattern are drawn in one stroke.

The pattern extraction by the one-dimension segment DP step 700 of FIG. 5 which uses the dynamic programming (DP) method is now explained.

The pattern extraction is based on the fact that the handwritten pattern is inputted in one of three input orders, (i) connecting line→pattern, (ii) pattern→connecting line, (iii) connecting line→pattern→connecting line. Namely, it is highly probable that the segment not necessary to the pattern recognition is inputted first or last. Accordingly, the first inputted segment and the last inputted segment are removed from the plurality of input segment elements so that the pattern portion is efficiently extracted.

The above process is specifically explained with reference to FIGS. 13a and 13b.

FIG. 13a shows a subsegmented input pattern. In this example, the element 1 should be deleted. FIG. 13b shows reconfiguration of the segment elements by the one-dimension segment DP method.

First, segment elements 1~4 are inputted. In the first step, only the last inputted segment element is deleted. In the second step, the first inputted segment element is deleted and the extraction succeeds. In the third and subsequent steps, the number of segment elements deleted is two and the pattern is not extracted whatever elements are deleted.

In this manner, the first and/or last segment elements are deleted from the input segment elements so that the extraction is effected for the pattern having a high probability of success. Accordingly, the pattern is extracted efficiently.

In accordance with the present invention, the handwritten pattern is divided into a plurality of segments in accordance with the characteristic data derived from the line connecting two of a plurality of sample points on the handwritten pattern. Accordingly, (1) the vibration in the handwritten pattern can be effectively absorbed, and (2) the handwritten pattern of any number of strokes is divided into segments so that the pattern is recognized independently from the number of strokes. Accordingly, the man-machine performance is improved.

More specifically, as shown in FIGS. 14a~14d, the restrictions of the number of strokes, the order of strokes, the rotation and the boundary of the handwritten pattern are significantly relieved.

For example, as shown in FIG. 14a, whatever the number of strokes of the input handwritten pattern is, the pattern is decomposed to the segments and hence the pattern recognition is independent from the number of strokes.

As shown in FIG. 14b, wherever the start point of the pattern is, the segments are sequenced clockwise by the code wrapping method. Therefore, the pattern recognition is independent from the order of strokes.

Even if the input pattern is inclined, the difference is evaluated by the angle difference between the adjacent segments. Accordingly, the pattern recognition is independent from the rotation of the input pattern (FIG. 14c).

Further, since the pattern portion can be extracted from the plurality of segments (by the one-dimension segment DP method), the pattern with the connecting line may be inputted without a boundary (FIG. 14d).

We claim:

1. An on-line recognition method for a handwritten pattern comprising the steps of:
    sampling successively coordinate information of strokes of a handwritten pattern;
    segmentalizing the coordinate information of one stroke into line segments consisting of at least either of straight line segments and curved line segments;
    quantizing the line segments so that the direction of each line segment is classified by one of predetermined angles;
    normalizing an input pattern constituted by the quantized line segments to determine presence and absence of connections between the line segments;
    rearranging the order of the quantized line segments in accordance with a predetermined connection sequence, on the basis of the determination result of the preceeding step;
    reading out a dictionary pattern already stored in a memory; and
    calculating degree of difference between the input pattern and the readout dictionary pattern by comparing the both on the basis of the quantized angles and the rearranged order of the quantized line segments, to thereby recognize the input pattern.

2. An on-line recognition method according to claim 1, further comprising, after said difference degree calculating step, a step of altering the number of the line segments to continue the recognition processing when non-matching is detected by the comparison in said difference degree calculating step.

3. An on-line recognition method according to claim 2, wherein in said segment number altering step, the first or last inputted segment is deleted first to continue the pattern recognition processing.

4. An on-line recognition method according to claim 2, wherein in said segment number altering step, the coordinate information of a next stroke is added to the coordinate information of the current stroke to continue the pattern recognition processing.

5. An on-line recognition method according to claim 1, wherein in said segmentalizing step, segmentalization is carried out by calculating an area encircled by a fold line sequentially connecting the coordinate points on the coordinate information of one stroke and a line connecting the start coordinate point and the end coordinate point of the coordinate information.

6. An on-line recognition method according to claim 5, wherein said segmentalizing step includes the substeps of:
    comparing the calculated area with a predetermined value;
    determining as a desired line segment the line connecting the start coordinate point and the end coordinate point of the coordinate information when the calculated area is smaller than the predetermined value; and
    dividing the fold line into two fold lines when the calculated area is not smaller than the predetermined value, to continue the segmentalizing step by comparing with the predetermined value an area encircled by the divided fold line and a line connecting the start coordinate point and the end coordinate point of the divided fold line.

7. An on-line recognition method according to claim 5, wherein in said segmentalizing step, two contiguous line segments are regarded as a curve to be compared with a curved portion of a dictionary pattern, when an absolute difference of angle made by the two segments is smaller than a predetermined angle and a sign thereof is equal to that of the difference of angle made by immediately preceding two line segments and a length ratio thereof is within a predetermined range.

8. An on-line recognition method according to claim 1, wherein in said difference degree calculating step, the difference of the quantized angles of each two contiguous rearranged line segments is compared with each corresponding difference of the readout dictionary pattern.

9. A recognition method for a handwritten pattern comprising the steps of:
    (a) sampling successively coordinate information of strokes of a handwritten pattern;
    (b) segmentalizing the sampled coordinate information by carrying out the following substeps:
        (i) calculating an area encircled by a fold line formed by the sampled coordinate information and a line connecting the start coordinate point and the end coordinate point of the fold line;
        (ii) comparing the calculated area with a predetermined value;
        (iii) determining as a segmentalized straight line of the fold line the line connecting the start coordinate point and the end coordinate point of the fold line when the calculated area is smaller than a predetermined value, and returning to the substep (i); and
        (iv) dividing the fold line into two fold lines and returning to the substep (i); and
    (c) after the segmentalizing step, carrying out a pattern recognition processing on the basis of the line segments.

10. A recognition method for a handwritten pattern comprising the steps of:
    (a) sampling successively coordinate information of strokes of a handwritten pattern;
    (b) segmentalizing the sampled coordinate information;
    (c) comparing an input pattern formed by line segments with a dictionary pattern already stored; and
    (d) when no-matching is detected by the comparison, deleting either one of the first and last line segments from the inputted line segments and then continuing a pattern recognition processing on the basis of the inputted line segments in which one line segment has been deleted.

11. An on-line handwritten pattern recognition apparatus comprising:
    a coordinate input unit for sampling serial coordinate information and pen-up and pen-down information of strokes of a handwritten pattern;
    a pattern recognition unit for comparing the input information from said input unit for each input stroke starting from pen-down and ending at pen-up with standard pattern information stored in a memory to determine analogy therebetween;

a pattern generation unit for generating reshaped information of the pattern recognized by said pattern recognition unit;

said pattern recognition unit including:

segmentation means for converting the input information from said coordinate input unit to straight line and curved line segments;

quantization data generation means for quantizing the segments in accordance with angles made by lines connecting start points and end points of the respective segments;

normalization means for listing presence or absence of connection between the start point and the end point of each of the segments;

sequencing means for rearranging the quantized data into one-dimension input data sequence based on said list;

difference calculation means for rearranging the standard pattern data into one-dimension standard data sequence by said sequencing means and comparing the one-dimension standard data sequence with the one-dimension input data sequence to calculate the analogy therebetween; and number of segments altering means for increasing or decreasing the number of segments to be compared with the standard pattern information when the difference is smaller than a predetermined value, to continue a pattern recognition processing.

12. An on-line handwritten pattern recognition apparatus according to claim 11 wherein said segmentation means includes:

calculation means for calculating an area encircled by segment pattern sequentially connecting points on the input stroke and a line connecting the start point and the end point of the segment pattern;

first decision means for determining whether the segment pattern is to be regarded as a straight line or not based on the area calculated by said calculation means; and second decision means for determining whether the segments determined as the straight line by said first decision means are a portion of a curved line.

13. An on-line handwritten pattern recognition apparatus according to claim 11 wherein said sequencing means includes means for selecting one segment from said segments and arranging the quantized data in one direction starting from the quantized data of said selected segment, based on said list.

14. An on-line handwritten pattern recognition apparatus according to claim 11 wherein said number of segments altering means includes a start pointer and an end pointer for the segments to be compared, means for incrementing or decrementing said pointers, and segment updating means for replacing the segments by new segments pointed by said pointers.

15. An on-line handwritten pattern recognition apparatus for evaluating analogy between a handwritten pattern and each of stored dictionary patterns, and of a pattern recognized to be identical to the handwritten pattern is found in the dictionary patterns, outputting that dictionary pattern as a recognized pattern, and if such a pattern is not found, repeating the above process for a next input handwritten pattern, characterized by that:

the handwritten pattern is divided into a plurality of segments in accordance with a value of an area encircled by a straight line connecting two of a plurality of sample points on the handwritten pattern and the sample points interposed between said two points and tracing said handwritten pattern.

16. An on-line handwritten pattern recognition apparatus according to claim 15 wherein the handwritten pattern is divided into a plurality of segments by substituting said handwritten pattern by a segment when said area is smaller than a predetermined threshold, and if said area is larger than the predetermined threshold, the line connecting the sample points is repeatedly shortened until said area becomes smaller than said threshold.

17. An on-line handwritten pattern recognition apparatus according to claim 16 wherein the line connecting the sample points is shortened by dividing each stroke of the handwritten pattern into n segments ($n \geq 2$, an integer), and if an angle difference of m contiguous segments ($n \geq m \geq 2$, an integer) is smaller than a predetermined angle, reducing the m segments to 1 ($m > 1$, an integer) segments.

18. An on-line handwritten pattern recognition apparatus according to claim 15 wherein the handwritten pattern is divided in accordance with a ratio of the length of the line connecting the two of the sampling points on the handwritten pattern and a sum of lengths of the segments tracing the handwritten pattern.

19. An on-line handwritten pattern recognition apparatus according to claim 18 wherein the handwritten pattern is substituted by a segment when said ratio is within a predetermined range, and if said ratio is not within the predetermined range, the line connecting the sample points on the handwritten pattern is repeatedly shortened until said ratio comes into said range.

20. An on-line handwritten pattern recognition apparatus according to claim 19 wherein the line connecting the sample points is shortened by dividing each stroke of the handwritten pattern into n ($n \geq 2$, an integer) segments, and if an angle difference of m ($n \geq m \geq 2$, an integer) contiguous segments is smaller than a predetermined angle, reducing m segments to 1 ($m > 1$, an integer) segments.

21. An on-line handwritten pattern recognition apparatus for evaluating analogy between a handwritten pattern and each of stored dictionary patterns, and if a pattern recognized to be identical to the handwritten pattern is found in the dictionary patterns, outputting that dictionary pattern as a recognized pattern, and if such a pattern is not found, repeating the above process for a next input handwritten pattern, characterized by that:

combinations consisting of portions of or entire handwritten pattern are compared with the dictionary patterns, the combinations consist of segments of the handwritten patterns, and the combination having a larger number of segments is compared first.

22. An on-line handwritten pattern recognition apparatus according to claim 21 wherein said segments are time-serially numbered, the segment having the smallest or largest number is deleted and the remaining segments are used as one of said combination.

23. An on-line handwritten pattern recognition apparatus according to claim 22 wherein the number of segments to be deleted is limited to n ($0 \leq n <$ number of input segments, an integer), and the opposite ends of the segment number sequence are alternately deleted.

24. An on-line handwritten pattern recognition apparatus according to claim 22 wherein a plurality of segments are deleted in one step when said segments include segments connected at an angle larger than a predetermined angle.

25. An on-line handwritten pattern recognition apparatus according to claim 22 wherein segments connected at an angle larger than a predetermined angle in said segments are deleted in one step.

26. An on-line handwritten pattern recognition apparatus according to claim 23 wherein a plurality of segments are deleted in one step when said segments include segments connected at an angle larger than a predetermined angle.

27. An on-line handwritten pattern recognition system according to claim 23 wherein segments connected at an angle larger than a predetermined angle in said segments are deleted in one step.

* * * * *